(12) United States Patent
Ono

(10) Patent No.: US 7,728,888 B2
(45) Date of Patent: Jun. 1, 2010

(54) CLAMPING CIRCUIT AND DIGITAL CAMERA SYSTEM HAVING THE CLAMPING CIRCUIT

(75) Inventor: Makoto Ono, Sagamihara (JP)

(73) Assignee: Olympus Corporation, Tokyo (JP)

( * ) Notice: Subject to any disclaimer, the term of this patent is extended or adjusted under 35 U.S.C. 154(b) by 1240 days.

(21) Appl. No.: 11/268,561

(22) Filed: Nov. 8, 2005

(65) Prior Publication Data

US 2006/0103743 A1 May 18, 2006

(30) Foreign Application Priority Data

Nov. 12, 2004 (JP) .............................. 2004-328336
Sep. 27, 2005 (JP) .............................. 2005-279120

(51) Int. Cl.
*H04N 5/16* (2006.01)
*H04N 5/18* (2006.01)
*H03K 5/08* (2006.01)

(52) U.S. Cl. ........................ 348/257; 348/689; 327/309; 327/312; 327/316

(58) Field of Classification Search ................. 348/257, 348/657, 673, 677, 691, 689; 327/307–319
See application file for complete search history.

(56) References Cited

U.S. PATENT DOCUMENTS

| | | | | |
|---|---|---|---|---|
| 4,625,240 A | * | 11/1986 | Yablonski et al. ........... | 348/484 |
| 5,032,740 A | * | 7/1991 | Kannegundla ............... | 327/321 |
| 5,296,929 A | * | 3/1994 | Morimoto .................... | 348/607 |
| 5,319,450 A | * | 6/1994 | Tamayama et al. .......... | 348/692 |
| 5,477,183 A | * | 12/1995 | Hayes ......................... | 327/306 |
| 6,580,465 B1 | * | 6/2003 | Sato ............................ | 348/689 |
| 7,468,760 B2 | * | 12/2008 | Huang et al. ................ | 348/695 |
| 7,646,412 B2 | * | 1/2010 | Hisamatsu et al. .......... | 348/257 |
| 2004/0008270 A1 | * | 1/2004 | Hisamatsu et al. .......... | 348/257 |
| 2004/0130375 A1 | * | 7/2004 | Tachibana ................... | 327/309 |
| 2004/0189839 A1 | * | 9/2004 | McDermott ................. | 348/243 |
| 2005/0237402 A1 | * | 10/2005 | Sase et al. ................... | 348/257 |
| 2007/0247533 A1 | * | 10/2007 | Hisamatsu et al. .......... | 348/257 |

FOREIGN PATENT DOCUMENTS

JP 06046287 A 2/1994

* cited by examiner

*Primary Examiner*—Sinh Tran
*Assistant Examiner*—Selam Gebriel
(74) *Attorney, Agent, or Firm*—Westerman, Hattori, Daniels & Adrian, LLP

(57) ABSTRACT

A clamping circuit including: a subtracter for subtracting a clamping correction voltage from an input analog voltage signal; A/D converter for converting an analog voltage signal from the subtracter into a digital voltage signal of M bits; a potential difference detection circuit for detecting a potential difference between a digital voltage signal outputted from the A/D converter and a previously set clamping voltage; D/A converter for converting a digital signal of N (N<M) bits within the digital signal of M bits representing a potential difference outputted from the potential difference detection circuit into an analog signal; an adjusting voltage generation circuit for generating an adjusting voltage based on a potential difference outputted from the potential difference detection circuit and a threshold voltage set with respect to the potential difference; and an adder for adding together an output from the D/A converter and an adjusting voltage outputted from the adjusting voltage generation circuit to generate the clamping correction voltage.

18 Claims, 10 Drawing Sheets

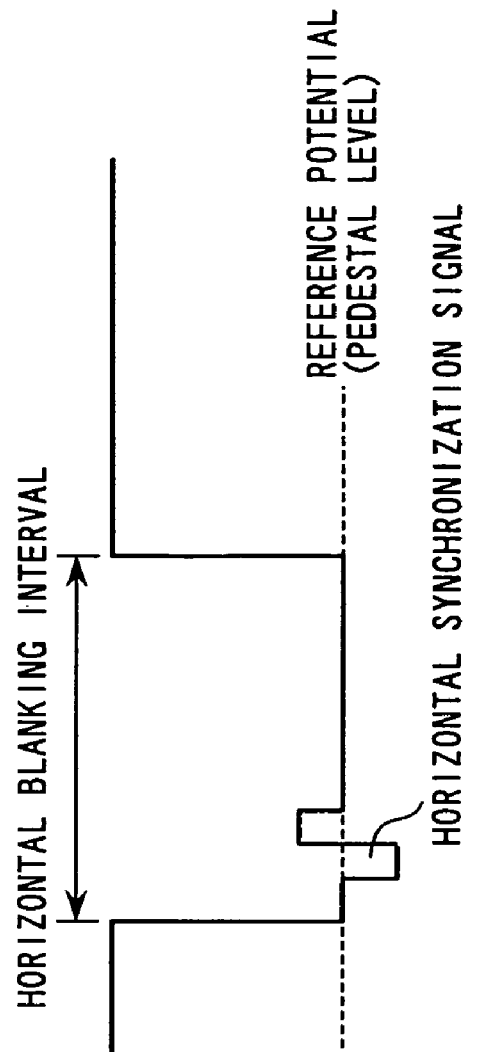
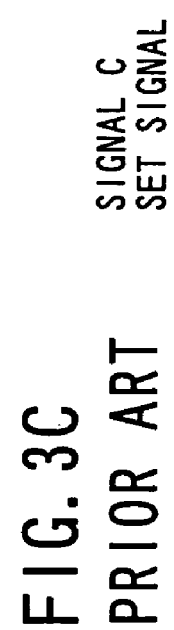
FIG. 3A PRIOR ART
FIG. 3B PRIOR ART
FIG. 3C PRIOR ART

CLAMPING CIRCUIT AND DIGITAL CAMERA SYSTEM HAVING THE CLAMPING CIRCUIT

This application claims benefit of Japanese Patent Applications No. 2004-328336 filed in Japan on Nov. 12, 2004 and No. 2005-279120 filed in Japan on Sep. 27, 2005, the contents of which are incorporated by these references.

BACKGROUND OF THE INVENTION

The present invention relates to clamping circuits for clamping input signals in the process of analog-to-digital conversion (A/D conversion), and more particularly relates to a clamping circuit and digital camera system mounting the clamping circuit where imaging signals in a video equipment such as digital camera using a solid-state imaging device such as CCD (Charge Coupled Device) are processed so that the signals become clamped to a digitally set value after A/D conversion.

Being developed in recent years among video equipment using an imaging device such as solid-state imaging device are digital cameras, etc., where analog image signals are converted into digital image signals so as to be stored for example to a memory. Of the image signals treated in such a video equipment, DC component is sometimes lost or DC component itself may fluctuate in the process up to their inputting into a digital signal processing circuit for example when a capacitance coupling amplifier is used to amplify image signals. In such a case, signals are different in pedestal level (blanking level: reference potential) between dark frame (black level) and bright frame, resulting in such disadvantages as that a portion to be displayed theoretically as white in a frame becomes gray or that change in contrast occurs in a frame. For this reason, the image signals as they are cannot be subjected to various correction or be accurately treated in a digital signal processing.

In video equipment, therefore, black level, i.e., pedestal level must be fixed before the digital signal processing. In digital cameras using a solid-state imaging device such as CCD, a portion of an invalid imaging area 102 occurring on the periphery of an effective imaging area 103 of a solid-state imaging device 101 as shown in FIG. 1 is totally concealed from light as portion for such a black level. An accurate DC component with a smaller error is regenerated from image signals with using the concealed-from-light optical black (OB) portion 104. The regenerated DC component is then superimposed on image signals to forcibly fix a reference black level, i.e., pedestal level.

A prior-art feedback clamping circuit for effecting regeneration process of such a DC component is disclosed for example in Japanese Patent Application Laid-Open Publication Hei-6-46287.

FIG. 2 is a block diagram showing an example of the prior-art feedback clamping circuit disclosed in the above publication. The feedback clamping-circuit includes: a differential amplifier 201; A/D converter 202; a first register 203; a subtracter 204; an adder 205; a second register 206; D/A converter 207; and a timing generator 208.

The differential amplifier 201 clamps analog image signals inputted into the differential amplifier by inputting a correction potential to an inversion input section of the differential amplifier 201. The A/D converter 202 converts the analog image signals clamped at the differential amplifier 201 into digital signals. The first register 203 retains black level (pedestal level) for the clamped digital image signals at timings given from the timing generator 208.

The subtracter 204 detects an error between the pedestal level retained at the first register 203 and a previously set normal pedestal level. The adder 205 adds together the error in potential that is detected at the subtracter 204 and a correction potential computed at the processing at the last time to update correction potential. The second register 206 retains the updated correction potential at timing from the timing generator 208. The D/A converter 207 converts the updated new correction potential into an analog signal and feeds it back to the inversion input section of the differential amplifier 201 as a clamping potential for input analog image signal.

The operation of the above described prior-art feedback clamping circuit will now be described with reference to FIGS. 2 and 3A to 3C. FIGS. 3A to 3C are timing charts showing signal waveforms for explaining operation of the prior-art feedback clamping circuit. The horizontal direction in FIGS. 3A to 3C represents timing axis and the vertical direction represents signal axis. FIG. 3A indicates an image signal (signal A) at the pedestal level of which DC component has been lost; FIG. 3B indicates a clamping timing signal (signal B); and FIG. 3C indicates a set signal (signal C).

First, when an analog image signal (signal A of FIG. 3A) without having DC component is inputted to the differential amplifier 201, the input analog image signal is clamped at the differential amplifier 201 by means of a level correction potential transmitted from D/A converter 207 and is provided as output. The clamped analog image signal is converted into a digital signal at A/D converter 202 and is outputted to an outputting section, usually a digital signal processing section (not shown) and to the first register 203.

When the clamped digital image signal is inputted to the first register 203, a pedestal level of the input digital image signal is extracted/retained by means of a clamp timing signal corresponding to the timing of pedestal (blanking) of the digital image signal and is provided as output. The clamp timing signal is the signal (signal B of FIG. 3B) which is generated at the timing generator 208 and is transmitted respectively to the first register 203 and to the second register 206.

Next, when the pedestal level outputted from the first register 203 is inputted to the subtracter 204; a previously set normal pedestal level is subtracted from such pedestal level at the subtracter 204. The result of subtraction at the subtracter 104 is a data indicating an error between the pedestal level of the input digital image signal and the previously set normal pedestal level (set value shown in FIG. 2).

Further, when the above error data is inputted to the adder 205, the adder 205 adds together the error data and a correction potential from the second register 206 that has been given to the differential amplifier 201 through D/A converter in the processing of last time, and outputs the result as a new correction potential. At this time, if an overflow occurs of the correction potential output value from the adder 205, a maximum value thereof is outputted, while a value of zero is outputted if it is a minus.

The new correction potential outputted from the adder 205 is inputted to the second register 206, and it is updated and retained for one horizontal period by a set signal (signal C of FIG. 3C) that is delayed from the clamp timing signal (signal B of FIG. 3B) and is generated at one timing during a horizontal blanking interval. The set signal is inputted to the second register 206 from the timing generator 208 so that the correction potential outputted from the second register 206 is updated every time when the above described clamp timing signal is generated. The new correction potential outputted from the second register 206 is converted into an analog signal by D/A converter 207 and is inputted to the differential amplifier 201. The input analog image signal without having DC component is thereby clamped to a new correction potential, i.e., receives a DC component.

SUMMARY OF THE INVENTION

It is an object of the present invention to provide a clamping circuit and digital camera system using the same where circuit size and current consumption are reduced without affecting clamping precision and the pulling operation in clamping.

In a first aspect of the invention, there is provided a clamping circuit including: a subtracter for subtracting a clamping correction voltage from an input analog voltage signal; A/D converter for converting an analog voltage signal from the subtracter into a digital voltage signal of M bits; a potential difference detection circuit for detecting a potential difference between a digital voltage signal outputted from the. A/D converter and a previously set clamping voltage; D/A converter for converting a digital signal of N (N<M) bits within the digital signal of M bits representing a potential difference outputted from the potential difference detection circuit into an analog signal; an adjusting voltage generation circuit for generating an adjusting voltage based on a potential difference outputted from the potential difference detection circuit and a threshold voltage set with respect to the potential difference; and an adder for adding together an output from the D/A converter and an adjusting voltage outputted from the adjusting voltage generation circuit to generate the clamping correction voltage.

A first to third embodiments of the clamping circuit shown in FIGS. 4 to 6 are embodiments corresponding to the clamping circuit according to the first aspect. Of the components in these, those corresponding to the adjusting voltage generation circuit are: a difference voltage detection circuit, bit switch circuit, reference voltage switch circuit and sample hold circuit in the first embodiment shown in FIG. 4; a difference voltage detection circuit and variable voltage source in the second embodiment shown in FIG. 5; and a difference voltage detection circuit, bit distribution circuit and second D/A converter in the third embodiment shown in FIG. 6. Further, a first reference voltage corresponds to the clamping voltage, and a second reference voltage to the threshold voltage.

In a second aspect of the invention, the adjusting voltage generation circuit in the clamping circuit according to the first aspect includes a control circuit for generating a control signal corresponding to a difference voltage between the potential difference and the threshold voltage, and an adjusting voltage generating section for generating an adjusting voltage corresponding to the control signal.

The first to third embodiments of the clamping circuit shown in FIGS. 4 to 6 are embodiments corresponding to the clamping circuit according to the second aspect. A difference voltage detection circuit corresponds to the control circuit of the components thereof.

In a third aspect of the invention, the adjusting voltage generating section in the clamping circuit according to the second aspect includes: a bit switch circuit where the bits of digital signal representing a potential difference outputted from the potential difference detection circuit to be inputted to the D/A converter are switched to low-order bits; a reference voltage switch circuit for switching a reference voltage of the D/A converter to a reference voltage corresponding to the low-order bits; and a sample hold circuit for holding an output of the D/A converter and outputting it as an adjusting voltage. The functions of the bit switch circuit, reference voltage switch circuit, and sample hold circuit are respectively activated when the control signal indicating that the difference voltage is lower than a predetermined voltage is inputted.

The first embodiment of the clamping circuit shown in FIG. 4 corresponds to an embodiment corresponding to the clamping circuit according to the third aspect.

In a fourth aspect of the invention, the adjusting voltage generating section in the clamping circuit according to the second aspect includes a variable voltage source for generating an adjusting voltage corresponding to the control signal.

The second embodiment of the clamping circuit shown in FIG. 5 corresponds to an embodiment corresponding to the clamping circuit according to the fourth aspect.

In a fifth aspect of the invention, the D/A converter in the clamping circuit according to the second aspect is formed as a first D/A converter, and the adjusting voltage generating section includes: a second D/A converter for converting a digital signal of L (L<M) bits within the digital signal of M bits from the potential difference detection circuit into an analog signal to output it as the adjusting voltage; and a bit distribution circuit for, of the digital signal of M bits from the potential difference detection circuit, outputting a high-order N-bit digital signal to the first D/A converter and a low-order L-bit digital signal to the second D/A converter and for providing the high-order N-bit digital signal as a fixed output correspondingly to the control signal.

The third embodiment of the clamping circuit shown in FIG. 6 corresponds to an embodiment corresponding to the clamping circuit according to the fifth aspect.

In a sixth aspect of the invention, the clamping circuit according to the first aspect further includes an averaging circuit for finding a mean value during a predetermined period of digital signals representing a potential difference outputted from the potential difference detection circuit to be inputted into the D/A converter.

The first and second embodiments of the clamping circuit shown in FIGS. 4 and 5 correspond to embodiments corresponding to the clamping circuit according to the sixth aspect.

In a seventh aspect of the invention, the clamping circuit according to the fifth aspect further includes an averaging circuit for finding a mean value during a predetermined period of digital signals representing potential difference outputted from the potential difference detection circuit to be inputted to the first and second D/A converters.

The third embodiment of the clamping circuit shown in FIG. 6 corresponds to an embodiment corresponding to the clamping circuit according to the seventh aspect.

In an eighth aspect of the invention, there is provided a digital camera system including: an imaging device for converting an object image into video signals as output; and the clamping circuit according to claim 1 to which video signals from the imaging device are inputted as the input analog voltage signal, where a black level of the video signals is set as the clamping voltage and an output of the A/D converter is outputted as a digital video signal.

A first embodiment and its modification and a second embodiment of the digital camera system shown in FIGS. 7 and 8 correspond to embodiments corresponding to the digital camera system according to the eighth aspect.

In a ninth aspect of the invention, the digital camera system according to the eighth aspect further includes a decision circuit for deciding whether an exposure time exceeds a set value or not, where the adjusting voltage generation circuit stops its operation when result of deciding by the decision circuit is that the exposure time does not exceed the set value.

A third to fifth embodiments of the digital camera system shown in FIGS. 9 to 11 correspond to embodiments corresponding to the digital camera system according to the ninth aspect.

In a tenth aspect of the invention, there is provided a clamping circuit including: A/D converter for converting an input analog voltage signal into a digital voltage signal to provide it as output; a potential difference detection circuit for detecting a potential difference between a digital output signal A/D-converted by the A/D converter and a first reference voltage serving as a clamping voltage; a bit switch circuit for switching between high-order bits and low-order bits of a digital output signal of the potential difference detection circuit; D/A converter for converting a digital output signal of the bit switch circuit into an analog signal; a sample hold circuit for holding and outputting an output of the D/A converter by high-order bits immediately before the switching of the bit switch circuit from the high-order bits to the low-order bits; an adder for adding together an output of the sample hold circuit and an output of the D/A converter to output the result thereof as a clamping correction voltage; a subtracter for effecting a subtraction between an output of the adder and the input analog voltage signal before A/D conversion by the A/D converter and for inputting the subtraction output thereof to the A/D converter; a difference voltage detection circuit for comparing an output of the potential difference detection circuit and a second reference voltage so as to control the bit switch circuit and a reference value of the D/A converter and an output of the sample hold circuit by the comparison output thereof; and an averaging circuit for finding and outputting a mean value of the digital output signals in the portion from an output terminal of the A/D converter to an input terminal of the D/A converter.

The first embodiment of the clamping circuit shown in FIG. 4 corresponds to an embodiment corresponding to the clamping circuit according to the tenth aspect.

In an eleventh aspect of the invention, there is provided a clamping circuit including: A/D converter for converting an input analog voltage signal into a digital voltage signal to provide it as output; a potential difference detection circuit for detecting a potential difference between a digital output signal A/D-converted at the A/D converter and a first reference voltage serving as a clamping voltage; D/A converter for converting a digital output signal of the potential difference detection circuit into an analog signal; a difference voltage detection circuit for comparing the output signal of the potential difference detection circuit and a second reference voltage; a variable voltage source capable of changing an output voltage based on an output of the difference voltage detection circuit; an adder for adding together the output voltage of the variable voltage source and an output of the D/A converter to output the result thereof as a clamping correction voltage; a subtracter for effecting a subtraction between an output of the adder and the input analog voltage signal before A/D conversion by the A/D converter and for inputting a subtraction output thereof to the A/D converter; and an averaging circuit for finding and outputting a mean value of the digital output signals in the portion from an output terminal of the A/D converter to an input terminal of the D/A converter.

The second embodiment of the clamping circuit shown in FIG. 5 corresponds to an embodiment corresponding to the clamping circuit according to the eleventh aspect.

In a twelfth aspect of the invention, there is provided a clamping circuit including: A/D converter for converting an input analog voltage signal into a digital voltage signal to provide it as output; a potential difference detection circuit for detecting a potential difference between a digital output signal A/D-converted by the A/D converter and a first reference voltage serving as a clamping voltage; a bit distribution circuit for outputting high-order bits and low-order bits of a digital output signal of the potential difference detection circuit; a first D/A converter for converting a digital output signal of the high-order bits by the bit distribution circuit into an analog signal; a second D/A converter for converting a digital output signal of the low-order bits by the bit distribution circuit into an analog signal; an adder for adding together an output of the first D/A converter and an output of the second D/A converter to output the result thereof as a clamping correction voltage; a subtracter for effecting a subtraction between an output of the adder and the input analog voltage signal before A/D conversion by the A/D converter and for inputting a subtraction output thereof to the A/D converter; a difference voltage detection circuit for comparing the output signal of the potential difference detection circuit and a second reference voltage and for providing an output by the high-order bits of the bit distribution circuit as a fixed output depending on a comparison output thereof; and an averaging circuit for finding and outputting a mean value of the digital output signals in the portion from an output terminal of the A/D converter to an input terminal of the first D/A converter.

The third embodiment of the clamping circuit shown in FIG. 6 corresponds to an embodiment corresponding to the clamping circuit according to the twelfth aspect.

In a thirteenth aspect of the invention, there is provided a digital camera system including: an imaging device for converting an object image into video signals as output; and the clamping circuit according to claim 10 to which video signals from the imaging device are inputted as the input analog voltage signal, where a black level of the video signals is set as the clamping voltage and an output of the A/D converter is outputted as a digital video signal.

The first embodiment of the digital camera system shown in FIG. 7 corresponds to an embodiment corresponding to the digital camera system according to the thirteenth aspect.

In a fourteenth aspect of the invention, the digital camera system according to the thirteenth aspect further includes a decision circuit for deciding whether an exposure time exceeds a set value or not, where the difference voltage detection circuit and the sample hold circuit stop their operation when a result of the decision is that the exposure time does not exceed the set value.

The third embodiment of the digital camera system shown in FIG. 9 corresponds to an embodiment corresponding to the digital camera system according to the fourteenth aspect. Further, an exposure time detection circuit 34 corresponds to the decision circuit of the components thereof.

In a fifteenth aspect of the invention, there is provided a digital camera system including: an imaging device for converting an object image into video signals as output; and the clamping circuit-according to claim 11 to which video signals from the imaging device are inputted as the input analog voltage signal, where a black level of the video signals is set as the clamping voltage and an output of the A/D converter is outputted as a digital video signal.

A modification of the first embodiment of the digital camera system shown in FIG. 7 corresponds to an embodiment corresponding to the digital camera system according to the fifteenth aspect.

In a sixteenth aspect of the invention, the digital camera system according to the fifteenth aspect further includes a decision circuit for deciding whether an exposure time exceeds a set value or not, where the difference voltage detection circuit and the variable voltage source stop their operation when a result of the decision is that the exposure time does not exceed the set value.

The fourth embodiment of the digital camera system shown in FIG. 10 corresponds to an embodiment corresponding to the digital camera system according to the sixteenth aspect. Further, an exposure time detection circuit 34 corresponds to the decision circuit of the components thereof.

In a seventeenth aspect of the invention, there is provided a digital camera system including: an imaging device for converting an object image into video signals as output; and the clamping circuit according to claim 12 to which video signals from the imaging device are inputted as the input analog voltage signal, where a black level of the video signals is set as the clamping voltage and an output of the A/D converter is outputted as a digital video signal.

The second embodiment of the digital camera system shown in FIG. 8 corresponds to an embodiment corresponding to the digital camera system according to the seventeenth aspect.

In an eighteenth aspect of the invention, the digital camera system according to the seventeenth aspect further includes a decision circuit for deciding whether an exposure time exceeds a set value or not, where the difference voltage detection circuit and the first D/A converter stop their operation when a result of the decision is that the exposure time does not exceed the set value.

The fifth embodiment of the digital camera system shown in FIG. 11 corresponds to an embodiment corresponding to the digital camera system according to the eighteenth aspect. Further, an exposure time detection circuit 34 corresponds to the decision circuit of the components thereof.

BRIEF DESCRIPTION OF THE DRAWINGS

FIGS. 3A, 3B, and 3C are a timing chart showing clamping operation in the clamping circuit shown in FIG. 2.

DESCRIPTION OF THE PREFERRED EMBODIMENTS

Some embodiments according to the present invention will be described below with reference to the drawings.

Figure 4:
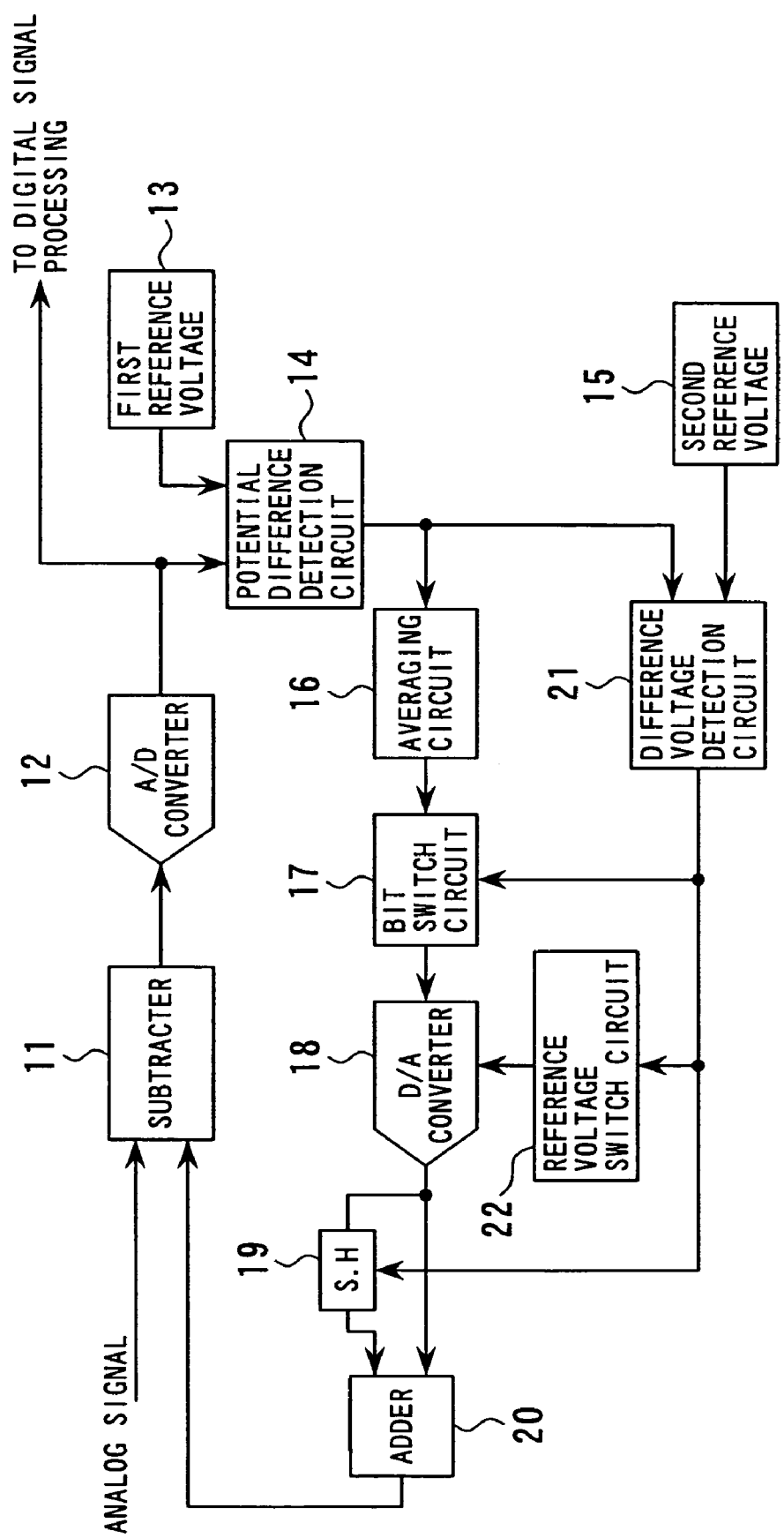
FIG. 4 is a block diagram showing construction of a first embodiment of the clamping circuit according to the invention.

An embodiment of the clamping circuit according to the invention will now be described. FIG. 4 is a block diagram showing a first embodiment of the clamping circuit according to the invention. The clamping circuit according to the first embodiment includes: a subtracter 11; A/D converter 12; a first reference voltage 13; a potential difference detection circuit 14; a second reference voltage 15; an averaging circuit 16; a bit switch circuit 17; D/A converter 18; a sample hold (S/H) circuit 19; an adder 20; a difference voltage detection circuit 21; and a reference voltage switch circuit 22.

Here, an input analog voltage signal to be clamped and an output of the adder 20 serving as a correction signal for feedback clamping are inputted and connected to the subtracter 11, and an output of the subtracter 11 is inputted and connected to the A/D converter 12 where it is converted into a digital voltage signal. In order then to detect and output an error between the A/D-converted digital voltage signal and the first reference voltage 13 serving as a previously set clamping reference value, an output of the A/D converter 12 and the first reference voltage 13 are inputted to the potential difference detection circuit 14. The output signals of the potential difference detection circuit 14 are the inputted and connected to two circuits. In particular, one of the output signals is inputted to the averaging circuit 16 and the other is inputted to the difference voltage detection circuit 21. It should be noted that the second reference voltage 15 is also inputted to the difference voltage detection circuit 21.

An output of the averaging circuit 16 is inputted to the bit switch circuit 17 so that, at the bit switch circuit 17, a predetermined number of bits on the high-order (MSB) side or a predetermined number of bits on the low-order (LSB) side in all bits of the output data of the averaging circuit 16 are switched and outputted depending on output level of the potential difference detection circuit 14. An output of the bit switch circuit 17 is inputted to the D/A converter 18 for converting digital signal into analog signal, and an output of the D/A converter 18 is inputted to the sample hold (S/H) circuit 19 for holding and outputting the D/A-converted analog signal immediately before the switching from high-order bits to low-order bits. Further, an output of the S/H circuit 19 and the D/A-converted analog signal of D/A converter 18 are inputted and connected to the adder 20.

Also connected to D/A converter 18 is the reference voltage switch circuit 22 for switching reference voltage (reference level) of the D/A converter 18 as a result of the switching from high-order bits to low-order bits. The operations of the bit switch circuit 17, reference voltage switch circuit 22, and S/H circuit 19 are controlled by the difference voltage detection circuit 21.

An operation of the clamping circuit constructed as the above will now be described. In an initial process of the clamping operation, DC component of input analog signal is not clamped to a desired value. First, the analog signal is inputted to the subtracter 11. At the subtracter 11, the input analog signal is clamped by a clamping correction voltage outputted from the adder 20 and is provided as output. The clamped analog signal is inputted to A/D converter 12 to be formed into a digital signal and then is split into two directions. One is outputted to a digital signal processing circuit (not shown), and the other is inputted to the potential difference detection circuit 14 in the clamping period to be subjected to subtraction with level of the first reference voltage 13 serving as a clamping voltage. An output of the potential difference detection circuit 14 becomes data indicating error between level of the output signal of A/D converter 12 in the clamping period and level of the first reference voltage 13.

Next, the error data outputted from the potential difference detection circuit 14 is split into two directions. One is inputted to the averaging circuit 16 for removing noise, where an average value of the error data in the clamping period is computed and is outputted as an averaged data. The averaged data is inputted to the bit switch circuit 17. The other of the error data is inputted to the difference voltage detection circuit 21 so as to be compared with level of the second reference voltage 15. An output of the difference voltage detection circuit 21 becomes a comparison data for deciding whether level of the above described error data exceeds a set level of the second reference voltage 15 or not.

The bit switch circuit 17 to which the averaged data is inputted selects and provides as output high-order bits of the averaged data (number of bits being bit number of D/A converter 18) based on the comparison data output from the difference voltage detection circuit 21 when level of the error data from the potential difference detection circuit 14 exceeds the set level of the second reference voltage 15 (condition where the clamping is not yet settled). It selects and provides as output low-order bits of the averaged data (number of bits being bit number of D/A converter 18) based on the comparison data output when level of the error data does not exceed the set level of the second reference voltage 15 (condition where the clamping is almost settled).

Next, an output of the bit switch circuit 17 is inputted to D/A converter 18 so as to be formed into an analog signal. Here, the reference voltage switch circuit 22 switches a reference level of D/A converter 18 based on the comparison data output of the difference voltage detection circuit 21 so that output of D/A converter 18 conforms to the dynamic range of A/D converter 12 when level of the error data exceeds the set level of the second reference voltage 15. For example, if the input range of A/D converter 12 is $1V^{P-P}$ at maximum, the reference level is switched so that output of the D/A converter 18 also becomes $1V^{P-P}$ or above at maximum. On the other hand, if level of the error data is lower than the set level of the second reference voltage 15, the reference voltage switch circuit 22 switches the reference level of D/A converter 18 to a reference level of D/A converter 18 obtained by dividing the reference level of D/A converter 18 at the time of the bit switch circuit 17 selecting high-order bits by what is corresponding to bit shift by the bit switch circuit 17. For example, when the difference between bit number of A/D converter 12 and bit number of D/A converter 18 is four bits, it switches to a reference level obtained by division into $½^4$.

Next, the D/A-converted analog signal is inputted to S/H circuit 19 for holding and outputting the D/A *conversion output signal immediately before the switching from high-order bits to low-order bits of the bit switch circuit 17 and to the adder 20. The addition output from the adder 20 to which output of S/H circuit 19 and output from D/A converter 18 are inputted is inputted to the subtracter 11 as a new clamping correction signal, and an input analog signal is clamped newly by the clamping correction voltage. By then repeating the above described sequence of operation, the A/D-converted digital signal is finally clamped to the voltage level of the first reference voltage 13 which serves as a clamping voltage.

It should be noted that, while the averaging circuit 16 in the present embodiment is to find an average of output data of the potential difference detection circuit 14, it is also possible to find an average of data of any other output as far as it occurs in the portion from the output of A/D converter 12 to the input of D/A converter 18 in the clamping circuit. Further, since the averaging circuit 16 is a circuit for removing signal noise during the clamping period, it can be replaced by other circuit (such as a digital filter) if similar effect can be obtained. Furthermore, because of the fact that the bit switch circuit 17 is provided, a change can be readily effected of the setting of bit number of the difference voltage to be inputted to D/A converter 18 corresponding to change in the first reference voltage 13, second reference voltage 15, etc.

Figure 5:
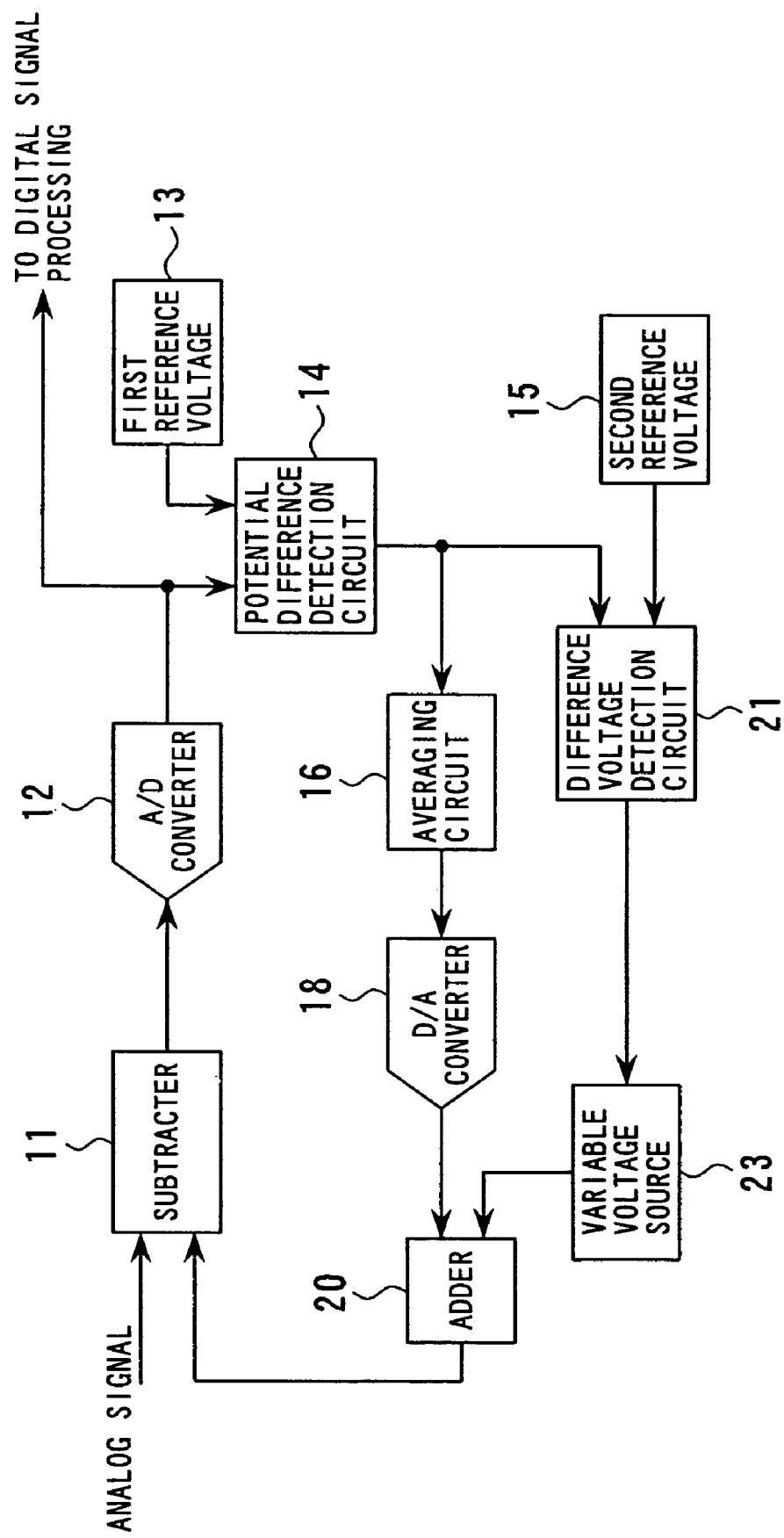
FIG. 5 is a block diagram showing construction of a second embodiment of the clamping circuit according to the invention.

A second embodiment of the clamping circuit according to the invention will now be described. FIG. 5 is a block diagram showing a clamping circuit according to the second embodiment, where identical or corresponding components as in the first embodiment shown in FIG. 4 are denoted by identical reference numerals. In the clamping circuit according to the present embodiment, an input analog signal to be clamped and an output of the adder 20 serving as a correction signal in feedback clamping are connected to the subtracter 11, and an output of the subtracter 11 is connected to A/D converter 12 where it is converted into a digital signal. The A/D-converted digital signal and the first reference voltage 13 are inputted to the potential difference detection circuit 14 to detect an error between the A/D-converted digital signal and the first reference voltage 13 serving as a previously set clamping reference value. The output digital signal of the potential difference detection circuit 14 is split into and connected to two directions. In particular, one of the output signals is connected to the averaging circuit 16 and the other is inputted and connected to the difference voltage detection circuit 21. An output of the averaging circuit 16 is inputted to D/A converter 18 for converting digital signal into analog signal. The difference voltage detection circuit 21 compares levels of the output of the potential difference detection circuit 14 and of the second reference voltage 15, and an output of the difference voltage detection circuit 21 is inputted and connected to a variable voltage source 23. An output of the variable voltage source 23 and an analog signal after D/A conversion at D/A converter 18 are then inputted and connected to the adder 20 so as to constitute a clamping circuit.

An operation of the clamping circuit constructed as the above will now be described. In an initial process of the clamping operation, DC component of input analog signal is not clamped to a desired value. First, the analog signal is inputted to the subtracter 11. The input analog signal to the subtracter 11 is clamped by a clamping correction voltage outputted from the adder 20 and then is provided as output. The clamped analog signal is inputted to A/D converter 12 to be formed into a digital signal and then is split into two directions. One is outputted to a digital signal processing circuit (not shown), and the other is inputted to the potential difference detection circuit 14 in the clamping period to be subjected to subtraction with level of the first reference voltage 13 serving as a clamping voltage. An output of the potential difference detection circuit 14 becomes data indicating error between level of the output signal of A/D converter 12 in the clamping period and level of the first reference voltage 13.

Next, the error data outputted from the potential difference detection circuit 14 is split into two directions. One is inputted to the averaging circuit 16 for removing noise, where an average value of the error data in the clamping period is computed and is outputted as an averaged data. The other one of the error data is inputted to the difference voltage detection circuit 21 so as to be compared with level of the second reference voltage 15. An output of the difference voltage detection circuit 21 becomes a comparison data for deciding whether level of the above described error data exceeds a set level of the second reference voltage 15 or not.

Next, low-order bits (bit number of D/A converter 18) of the averaged data are inputted to D/A converter 18 and is converted into analog signal by D/A converter 18 which is set so as to be the same level as the quantization step (1LSB) of A/D converter 12. Further, the comparison data outputted from the difference voltage detection circuit 21 controls the output level of the variable voltage source 23 so that the error data of the potential difference detection circuit 14 comes closer to the level of the second reference voltage 15. It continues to control the variable voltage source 23 until the error data of the potential difference detection circuit 14 is equalized to the second reference voltage 15.

Next, the D/A-converted analog signal and the output of the variable voltage source 23 are added together and outputted by the adder 20. The output of the adder 20 is inputted to the subtracter 11 as a new clamping correction signal, and an input analog signal is newly clamped by the clamping correction voltage. By repeating the above operation, the finally A/D-converted digital signal is clamped to the voltage level of the first reference voltage 13 which serves as a clamping voltage.

As the above, the output level of the variable voltage source 23 is controlled by the comparison data of the difference voltage detection circuit 21 so that the error data of the potential difference detection circuit 14 comes closer to the level of the second reference voltage 15. Since the variable voltage source 23 is continuously controlled until the error data of the potential difference detection circuit 14 is equalized to the second reference voltage 15, a voltage following a change in the error data can be produced.

It should be noted also in the present embodiment that, while the averaging circuit 16 finds an average of output data of the potential difference detection circuit 14, it is also possible to find an average of data of any other output as far as it occurs in the portion from the output of A/D converter 12 to the input of D/A converter 18 in the clamping circuit. Further, since the averaging circuit 16 is a circuit for removing signal noise during the clamping period, it can be replaced by other circuit (such as a digital filter) if similar effect can be obtained.

In the clamping circuit according to the second embodiment constructed as the above, the voltage of the sample hold circuit 19 in the clamping circuit according to the first embodiment shown in FIG. 4 is replaced by a variable voltage source 23, and the level of the variable voltage source 23 is caused to vary by output level of the difference voltage detection circuit 21. Further, data based on low-order bits of the A/D converter 12 are used for the D/A converter 18 in effecting the clamping. The clamping precision can be thereby improved (equivalent to precision of A/D conversion) without decreasing range to be pulled in the clamping even when bit number of A/D converter 12 is greater than bit number of D/A converter 18.

Figure 6:
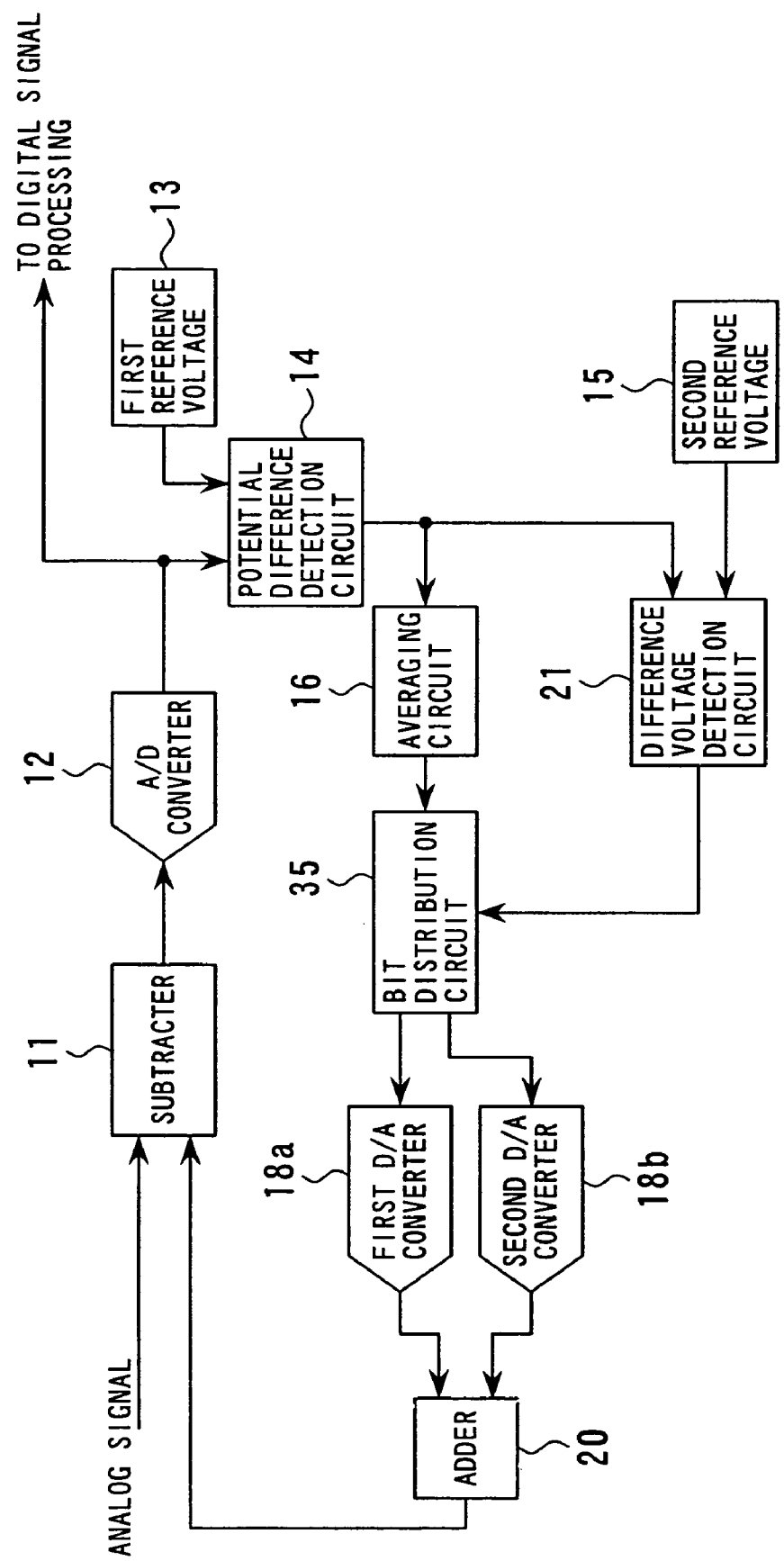
FIG. 6 is a block diagram showing construction of a third embodiment of the clamping circuit according to the invention.

A third embodiment of the clamping circuit according to the invention will now be described. FIG. 6 is a block diagram showing the third embodiment of the clamping circuit, where identical or corresponding components as in the first embodiment shown in FIG. 4 are denoted by identical reference numerals. In the clamping circuit according to the present embodiment, an input analog signal to be clamped and an output of the adder 20 serving as a correction signal in feedback clamping are connected to the subtracter 11, and an output of the subtracter 11 is inputted and connected to A/D converter 12 where it is converted into a digital signal. An output of A/D converter 12 and the first reference voltage 13 are inputted to the potential difference detection circuit 14 to detect and output an error between the A/D-converted digital signal and the first reference voltage 13 serving as a previously set clamping reference value. The output signal of the potential difference detection circuit 14 is inputted and connected to two circuits. In particular, one of the output signals of the potential difference detection circuit 14 is inputted to the averaging circuit 16 and the other is inputted to the difference voltage detection circuit 21. It should be noted that the second reference voltage 15 is also inputted to the difference voltage detection circuit 21.

Further, an output of the averaging circuit 16 is inputted and connected to a bit distribution circuit 35, and the bit distribution circuit 35 outputs a predetermined number of bits on the high-order (MSB) side and a predetermined number of bits on the low-order (LSB) side in the output data of the averaging circuit 16. The outputs of the bit distribution circuit 35 are respectively inputted to a first D/A converter 18a and second D/A converter 18b for converting the respective digital signals into analog signal, and an output of the first D/A converter 18a and output of the second D/A converter 18b are inputted and connected to the adder 20. Further, the operation of the bit distribution circuit 35 is to be controlled by the difference voltage detection circuit 21.

An operation of the clamping circuit constructed as the above will now be described. In an initial process of the clamping operation, DC component of input analog signal is not clamped to a desired value. First, the analog signal is inputted to the subtracter 11. At the subtracter 11, the input analog signal is clamped by a clamping correction voltage outputted from the adder 20 and is provided as output. The clamped analog signal is inputted to A/D converter 12 to be formed into a digital signal and then is split into two directions. One is outputted to a digital signal processing circuit (not shown), and the other is inputted to the potential difference detection circuit 14 in the clamping period to be subjected to subtraction with level of the first reference voltage 13 serving as a clamping voltage. An output of the potential difference detection circuit 14 becomes data indicating error between level of the output signal of A/D converter 12 in the clamping period and level of the first reference voltage 13.

Next, the error data outputted from the potential difference detection circuit 14 is split into two directions. One is inputted to the averaging circuit 16 for removing noise, where an average value of the error data in the clamping period is computed and is outputted as an averaged data. The averaged data is inputted to the bit distribution circuit 35. The other of the error data is inputted to the difference voltage detection circuit 21 so as to be compared with level of the second reference voltage 15. An output of the difference voltage detection circuit 21 becomes a comparison data for deciding whether level of the above described error data exceeds a set level of the second reference voltage 15 or not.

The bit distribution circuit 35 to which the averaged data is inputted provides high-order side bits (where the number of bits is bit number of the first D/A converter 18a) and low-order side bits (where the number of bits is bit number of the second D/A converter 18b) of the averaged data by the comparison data output from the difference voltage detection circuit 21 when level of the error data from the potential difference detection circuit 14 exceeds the set level of the second reference voltage 15 (condition where the clamping is not yet settled). On the other hand, when level of the error data does not exceed the set level of the second reference voltage 15 (condition where the clamping is almost settled), it provides output of the high-order side bits as a fixed output by the output of the comparison data.

Here, the reference level of the first D/A converter 18a is previously set so that output of the first D/A converter 18a conforms to the dynamic range of A/D converter 12. For example, if the input range of A/D converter 12 is $1V^{P-P}$ at maximum, the reference level is previously set so that output of the first D/A converter 18a also becomes $1V^{P-P}$ or above at maximum. The reference level of the second D/A converter 18b, on the other hand, is previously set so that output by 1LSB of the second D/A converter 18b becomes the quantization step level (1LSB or less) of A/D converter 12.

Next, the analog signals outputted from the first D/A converter 18a and second D/A converter 18b are inputted to the adder 20. An output of the adder 20 is then inputted to the subtracter 11 as a new clamping correction signal so that input analog signal is clamped newly by the clamping correction voltage. By then repeating operation of the above sequence, the finally A/D-converted digital signal is clamped to the voltage level of the first reference voltage 13 which serves as a clamping voltage.

It should be noted also in the present embodiment that, while the averaging circuit 16 finds an average of output data of the potential difference detection circuit 14, it is also possible to find an average of data of any other output as far as it occurs in the portion from the output of A/D converter 12 to the input of the first D/A converter 18a in the clamping circuit. Further, since the averaging circuit 16 is a circuit for removing signal noise during the clamping period, it can be replaced by other circuit (such as a digital filter) if similar effect can be obtained.

Figure 7:
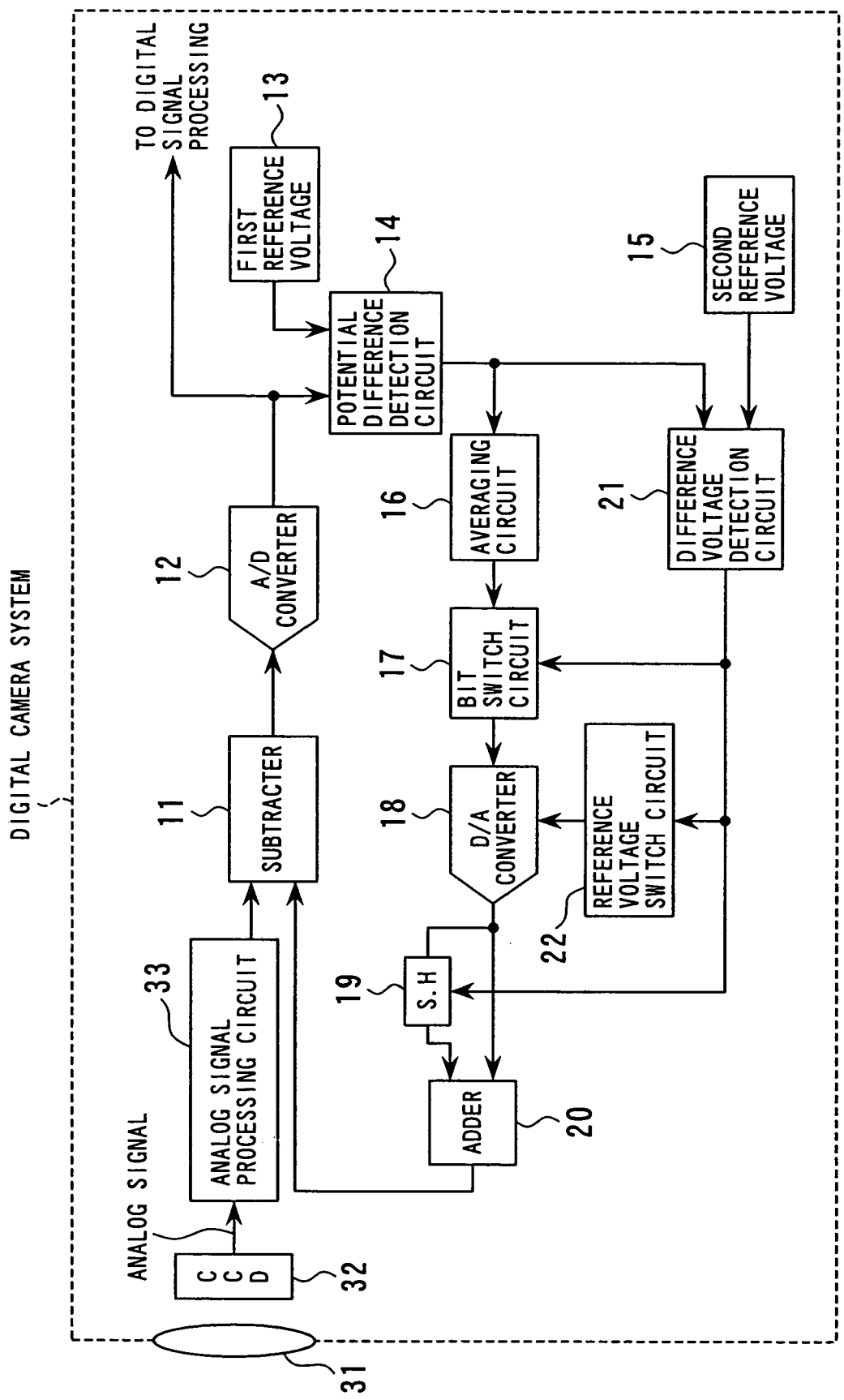
FIG. 7 is a block diagram showing construction of a first embodiment of the digital camera system according to the invention.

A first embodiment of digital camera system according to the invention will now be described. FIG. 7 is a block diagram showing construction of the digital camera system according to the present embodiment. In the digital camera system of the present embodiment, the clamping circuit shown in FIG. 4 is used in the black level clamping of video signals in a digital camera which includes: lens system 31; CCD imaging device 32; an analog signal processing circuit 33, etc.

Figure 1:
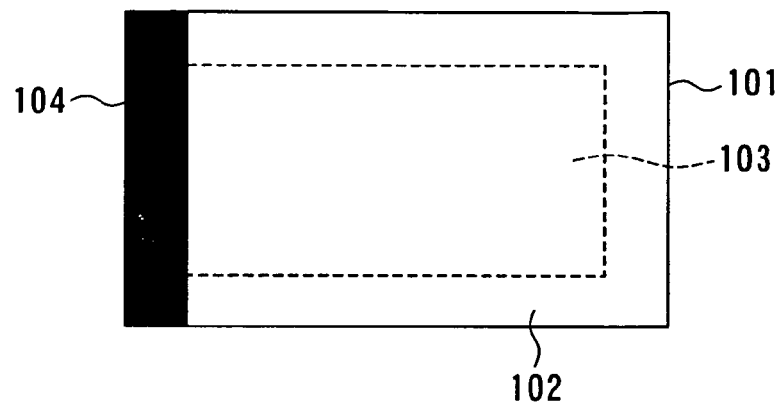
FIG. 1 shows location of an optical black level detecting portion of an imaging device.
Figure 2:
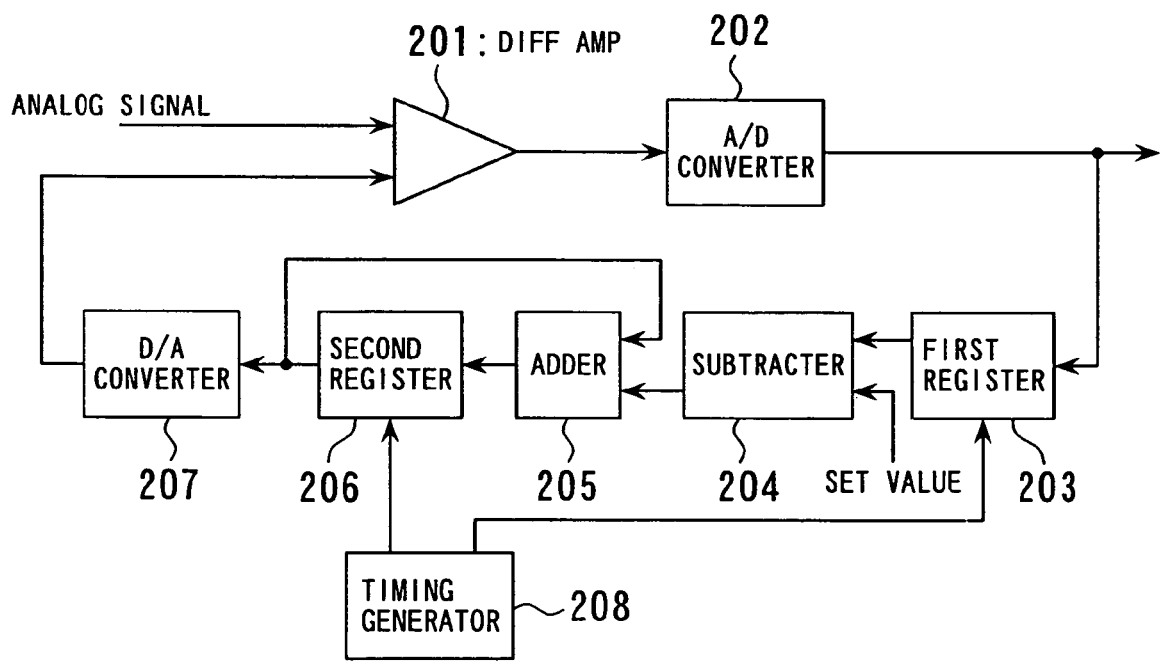
FIG. 2 is a block diagram showing construction of a prior-art feedback clamping circuit.

An operation will now be described of the clamping circuit in the digital camera system constructed as the above. In a video equipment such as digital camera, it is necessary to fix a black level, i.e., a pedestal level. In digital cameras using CCD imaging device, an optical black portion (see FIG. 1) concealed from light of CCD imaging device is used as such a black level portion to regenerate an accurate DC component with less error from video signals.

The regenerated DC component is then superimposed on image signals to forcibly fix a reference black level, i.e., a pedestal level.

Of analog video signals of CCD imaging device used in a digital camera or the like, dark current component of pixel signals (black level) of the optical black portion to be used as the clamping voltage is increased with an increase in exposure time. Especially in a long time exposure when taking a night view, analog video signals of the optical black portion of CCD imaging device significantly differ from the clamping reference voltage (first reference voltage 13) because of the increase in dark current. As a result, the error data, which is an output of the potential difference detection circuit 14, also becomes significantly large in such a condition.

In the present embodiment, even when the analog video signal level of an optical black portion of CCD imaging device extensively differs from the clamping reference level for example due to a long-time exposure, a suitable analog correction voltage can be obtained by detecting level of the error data at the difference voltage detection circuit 21. In particular, if the error data is greater than a set value (second reference voltage 15), high-order bits of output data of the averaging circuit 16 are selected by the bit switch circuit 17, and the reference level of D/A converter 18 is set by the reference voltage switch circuit 22 so that quantization step of D/A converter 18 exceeds quantization step of A/D converter 12. It is thereby possible to obtain an extensive analog correction voltage from D/A converter 18 by means of linear step with respect to fluctuation in the error data.

Supposing, for example, bit number of A/D converter 12 is 14 bits and the reference level (level to be quantized) of A/D converter 12 is 1V, quantization step of A/D converter 12 is:

$$1\,V/2^{14} \approx 61\,\mu V$$

Here, if the error data is greater than the second reference voltage 15, high-order bits of output data of the averaging circuit 16 are selected by the bit switch circuit 17, and the reference level of D/A converter 18 is set so that the quantization step of D/A converter 18 becomes 10 times the quantization step of A/D converter 12. Even if bit number of D/A converter 18 is 8 bits, a maximum value of analog correction voltage after D/A conversion is:

$$61\,\mu V \times 2^8 \times 10 = 156\,mV$$

Accordingly, even when an analog image signal of the optical black portion having for example an error data at the potential difference detection circuit 14 of 100 mV is inputted, such an analog image signal can be clamped.

Further, if the error data is smaller than the second reference voltage 15, low-order bits of output data of the averaging circuit 16 are selected by the bit switch circuit 17, and the reference level of D/A converter 18 is set so that the quantization step of D/A converter 18 is smaller than the quantization step of A/D converter 12. It is thereby possible to obtain from D/A converter 18 an analog correction voltage with which a quantization accuracy of A/D converter 12 can be secured with respect to fluctuation in the error data in condition where the clamping is stabilized (settled). Accordingly, the clamping of black level is possible without deteriorating clamping accuracy even in a digital camera system where for example the analog video signal level of the optical black portion of CCD imaging device 31 extensively fluctuates.

While one to which the clamping circuit shown in FIG. 4 is applied has been shown in the embodiment of the digital camera system in FIG. 7, the clamping circuit shown in FIG. 5 can also be suitably used. Although an illustration of this modification is omitted, an equivalent effect and advantage as the digital camera system shown in FIG. 7 can be obtained.

Figure 8:
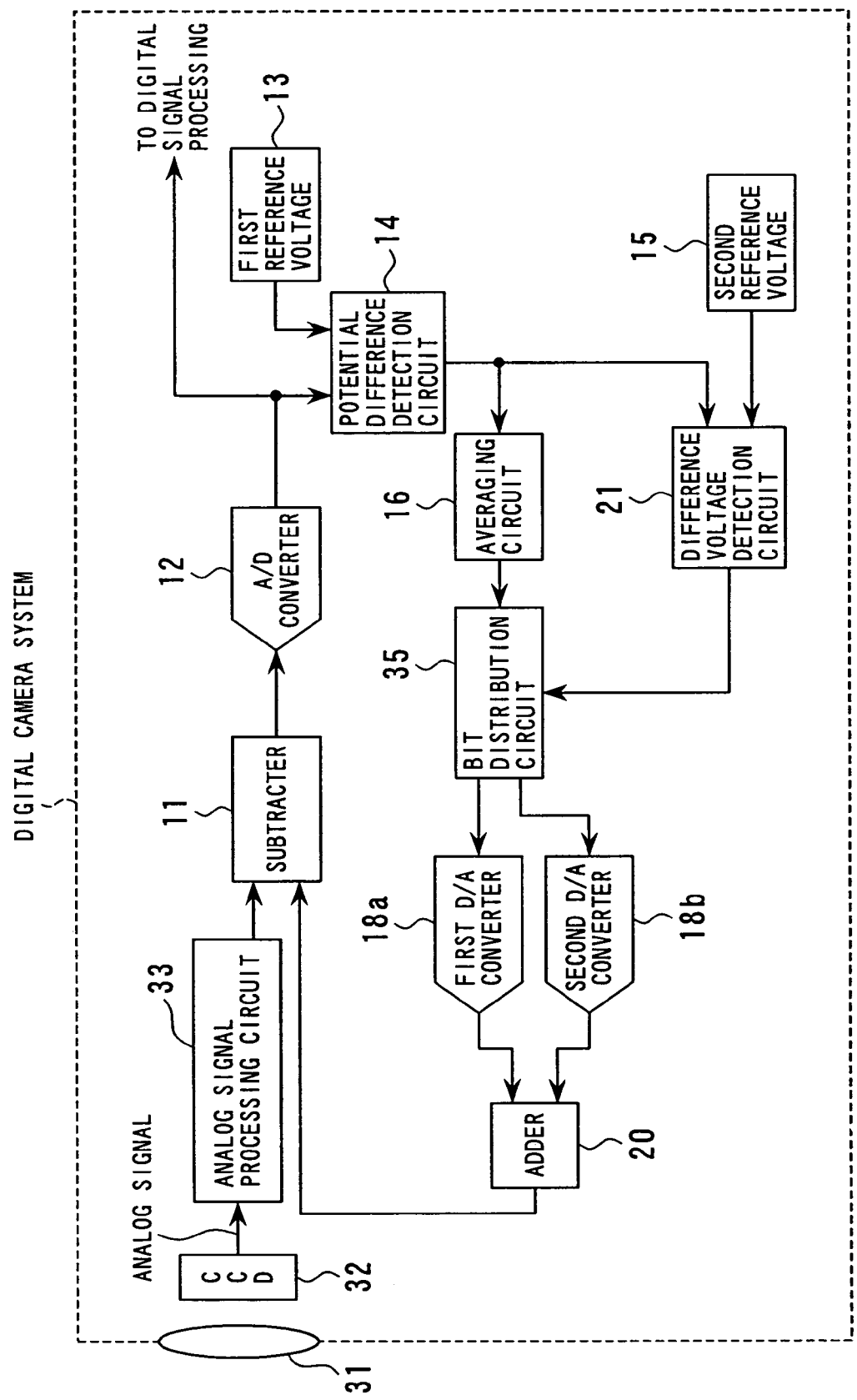
FIG. 8 is a block diagram showing construction of a second embodiment of the digital camera system according to the invention.

Further, the clamping circuit shown in FIG. 6 can also be suitably used in the first embodiment of the digital camera system shown in FIG. 7. FIG. 8 is a block diagram showing construction of a second embodiment of digital camera system to which the clamping circuit shown in FIG. 6 is applied instead of the clamping circuit of the first embodiment shown in FIG. 4.

In the digital camera system according to the present embodiment, even when the analog video signal level of an optical black portion of CCD imaging device extensively differs from the clamping reference level for example due to a long-time exposure, a suitable analog correction voltage can be obtained by detecting level of the error data at the difference voltage detection circuit 21. In particular, if the error data is greater than a set value (second reference voltage 15), high-order side bits and low-order side bits of output data of the averaging circuit 16 are respectively outputted to the first D/A converter 18a and second D/A converter 18b by the bit distribution circuit 35. Here, the reference level of first D/A converter 18a is previously set so that quantization step of the first D/A converter 18a exceeds quantization step of A/D converter 12, and the reference level of the second D/A converter 18b is previously set so that quantization step of the second D/A converter 18b is smaller than the quantization step of A/D converter 12. It is thereby possible to obtain an extensive analog correction voltage from the first D/A converter 18a and second D/A converter 18b by means of linear step for the fluctuation in the error data.

Supposing, for example, bit number of A/D converter 12 is 14 bits and the reference level (level to be quantized) of A/D converter 12 is 1V, quantization step of A/D converter 12 is:

$$1 \text{ V}/2^{14} \approx 61 \text{ }\mu\text{V}$$

Here, if the error data is greater than the second reference voltage 15, the high-order side bits of output data of the averaging circuit 16 are inputted to the first D/A converter 18a by the bit distribution circuit 35, and the reference level of the first D/A converter 18a is previously set so that the quantization step of the first D/A converter 18a becomes 10 times the quantization step of A/D converter 12. Thereby, even if bit number of the first D/A converter 18a is 8 bits, a maximum value of analog correction voltage after D/A conversion is:

$$61 \text{ }\mu\text{V} \times 2^8 \times 10 = 156 \text{ mV}$$

Accordingly, even when an analog video signal of the optical black portion having for example an error data at the potential difference detection circuit 14 of 100 mV is inputted, such an analog video signal can be clamped.

Further, if the error data is smaller than the second reference voltage 15, the high-order side output bits are provided as a fixed output by the bit distribution circuit 35 while the low-order side bits of output data of the averaging circuit 16 are inputted to the second D/A converter 18b, and the reference level of the second D/A converter 18b is previously set so that the quantization step of the second D/A converter 18b is smaller than the quantization step of A/D converter 12. It is thereby possible to obtain from the second D/A converter 18a an analog correction voltage with which a quantization accuracy of A/D converter 12 can be secured with respect to fluctuation in the error data in condition where the clamping is stabilized (settled). Thus, the clamping of black level is possible without deteriorating clamping accuracy even in a digital camera system where for example the analog video signal level of the optical black portion of CCD imaging device 31 extensively fluctuates.

Figure 9:
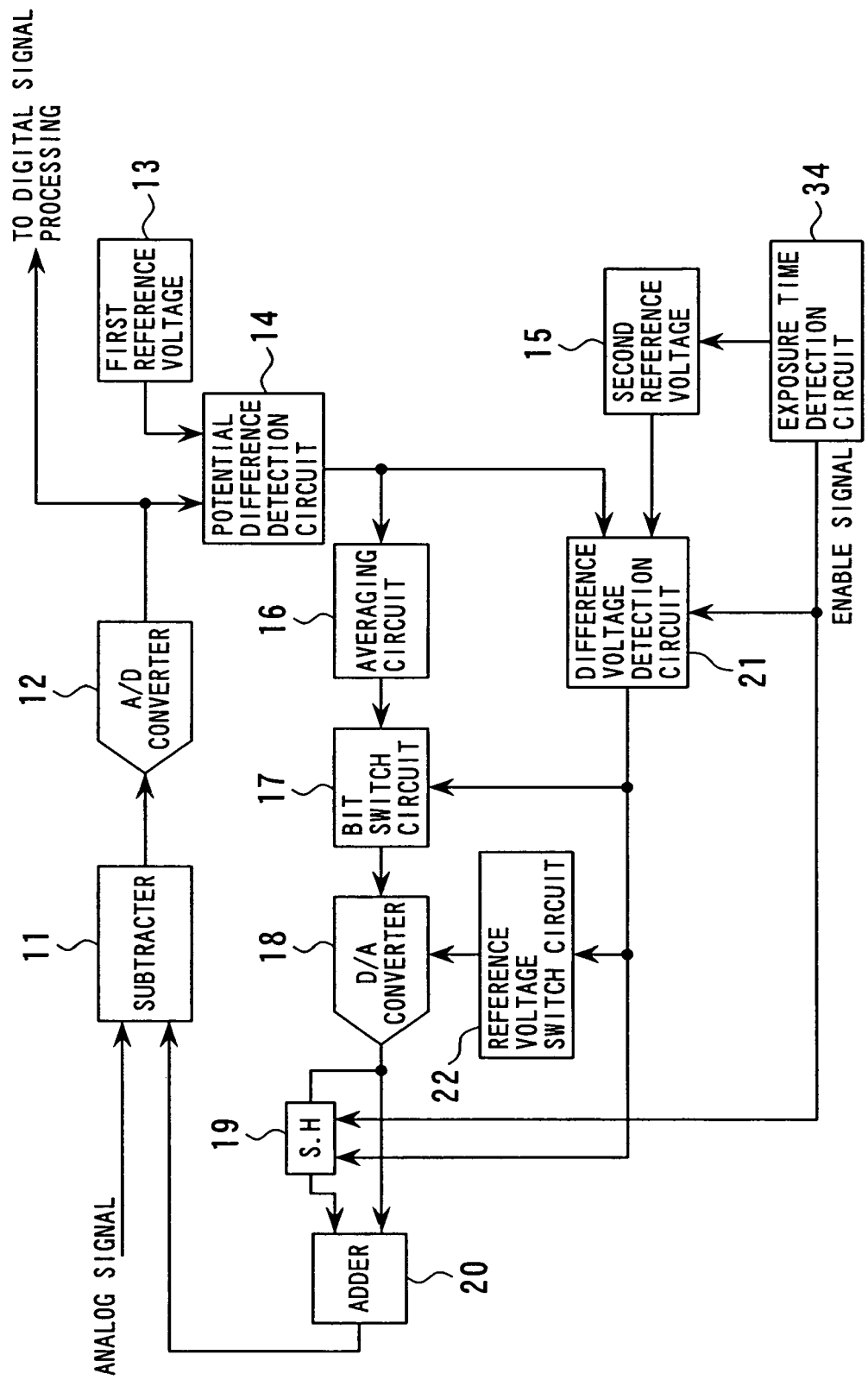
FIG. 9 is a block diagram showing construction of a main portion of a third embodiment of the digital camera system according to the invention.

FIG. 9 is a block diagram showing a main portion (clamping circuit portion) of a third embodiment of the digital camera system according to the invention. In this embodiment, an exposure time detection circuit 34 for deciding whether an exposure time exceeds a set value or not is further provided in the digital camera system shown in FIG. 7. If exposure time is less than the set value, operations of the second reference voltage 15, difference voltage detection circuit 21 and S/H circuit 19 are disenabled.

In thus constructed digital camera system, the exposure time detection circuit 34 for detecting exposure time is additionally provided in the digital camera system where the clamping circuit shown in FIG. 7 is mounted so that those circuits unnecessary at the time of normal exposure can be disenabled to reduce current to be spent in the digital camera system.

Figure 10:
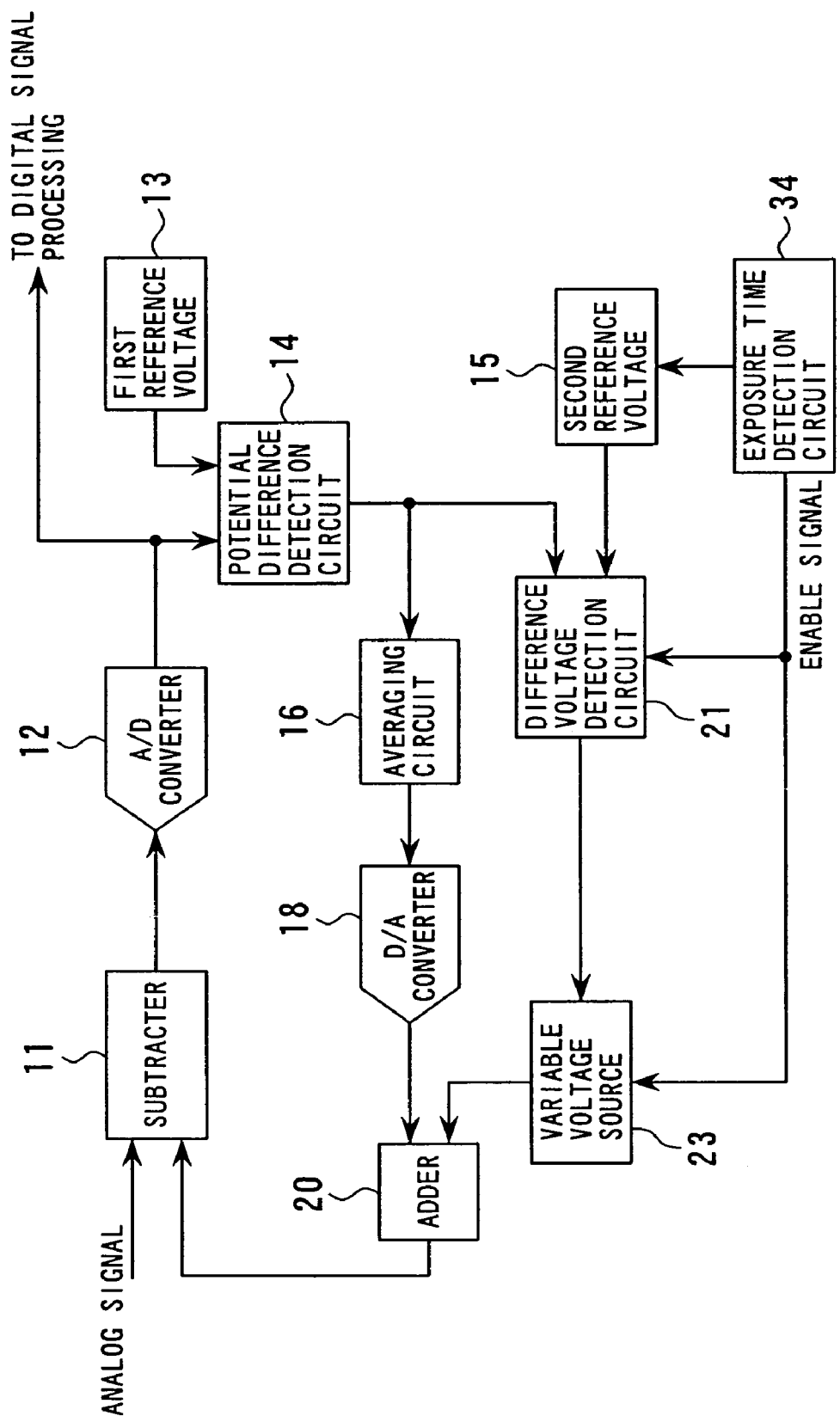
FIG. 10 is a block diagram showing construction of a main portion of a fourth embodiment of the digital camera system according to the invention.

FIG. 10 is a block diagram showing a main portion (clamping circuit portion) of a fourth embodiment of the digital camera system according to the invention. In this embodiment, an exposure time detection circuit 34 for deciding whether an exposure time exceeds a set value or not is further provided in the digital camera system having the clamping circuit shown in FIG. 5. If exposure time is less than the set value, operations of the second reference voltage 15, difference voltage detection circuit 21 and variable voltage source 23 are disenabled.

In thus constructed digital camera system, the exposure time detection circuit 34 for detecting exposure time is additionally provided in the digital camera system where the clamping circuit shown in FIG. 5 is mounted so that those circuits unnecessary at the time of normal exposure can be disenabled to reduce current to be spent in the digital camera system.

Figure 11:
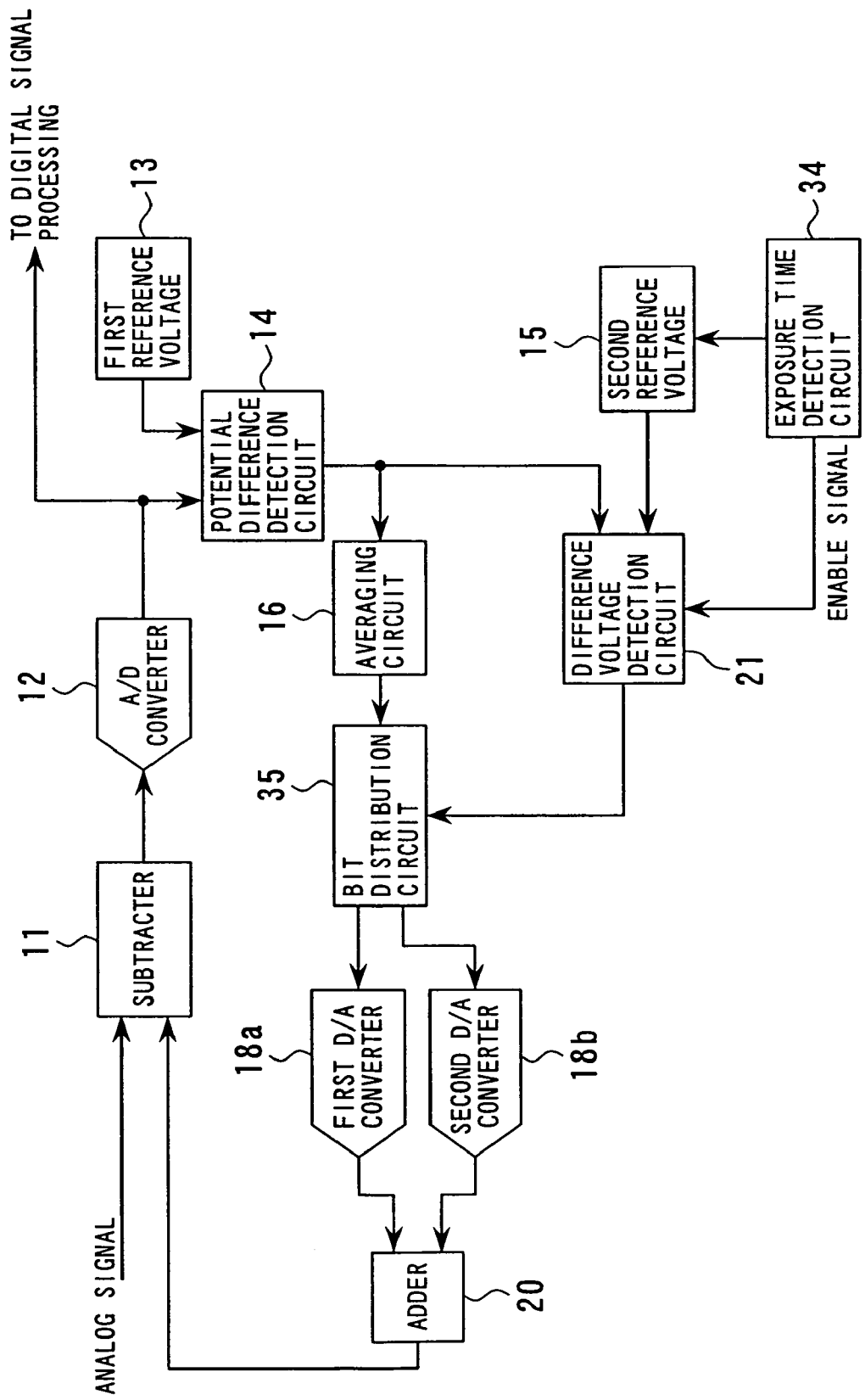
FIG. 11 is a block diagram showing construction of a main portion of a fifth embodiment of the digital camera system according to the invention.

FIG. 11 is a block diagram showing a main portion (clamping circuit portion) of a fifth embodiment of the digital camera system according to the invention. In this embodiment, an exposure time detection circuit 34 for deciding whether an exposure time exceeds a set value or not is further provided in the digital camera system having the clamping circuit shown in FIG. 8. If exposure time is less than the set value, operations of the second reference voltage 15 and difference voltage detection circuit 21 are disenabled.

In thus constructed digital camera system, the exposure time detection circuit 34 for detecting exposure time is additionally provided in the digital camera system where the clamping circuit shown in FIG. 8 is mounted so that those circuits unnecessary at the time of normal exposure can be disenabled to reduce current to be spent in the digital camera system.

As has been described by way of the above embodiments, in the clamping circuit according to the invention, without an increase in circuit size, a steady DC component with high clamping accuracy and smaller error can be regenerated without adversely affecting fundamental operation in clamping even when a large error occurs between signal's DC component and a set value for the clamping. Further, with a digital camera system where the clamping circuit according to the invention is mounted, power consumption in the system can also be reduced.

Advantages of each aspect of the invention are as follows. First, with the clamping circuit according to the first aspect of the invention, since a clamping correction voltage for clamping the input analog voltage signal to a clamping voltage is obtained by addition of an adjusting voltage and an output from D/A converter, clamping accuracy can be secured without decreasing the range to be pulled in the clamping while conversion bit number N of D/A converter is kept to a smaller conversion bit number than the conversion bit number M of A/D converter. It is thereby possible to reduce circuit size and current consumption. With the clamping circuit according to the second aspect, since the adjusting voltage generation circuit generates a control signal corresponding to difference voltage between a potential difference and the threshold voltage by means of a control circuit and generates an adjusting voltage corresponding to the control signal by an adjusting voltage generating section, it is possible to generate an adjusting voltage corresponding to the difference voltage. With the clamping circuit according to the third aspect, a change in the setting of bit number of digital signal for representing potential difference to be inputted to D/A converter corresponding to a change in the clamping voltage, threshold voltage, etc., can be readily effected in the clamping circuit according to the second aspect. With the clamping circuit according to the fourth aspect, since the adjusting voltage generating section generates an adjusting voltage corresponding to control signal by means of a variable voltage source, it is possible to generate an adjusting voltage that follows change in the control signal.

With the clamping circuit according to the fifth aspect, the adjusting voltage generating section outputs, by means of a bit distribution circuit, a digital signal of high-order N bits of a digital signal of M bits from the potential difference detection circuit to a first D/A converter and a digital signal of low-order L bits thereof to a second D/A converter and provides the high-order N-bit digital signal as a fixed output correspondingly to a control signal. It is therefore possible to improve clamping accuracy without decreasing the range to be pulled in the clamping even when bit number of A/D converter is greater than bit number of D/A converter. With the clamping circuit according to the sixth aspect, since a mean value of digital signals representing potential difference during a predetermined period is found by an averaging circuit and is inputted to D/A converter, a stable feedback operation can be effected without being too sensitive in following a change in the potential difference. With the clamping circuit according to the seventh aspect, since a mean value of digital signals representing potential difference during a predetermined period is found by an averaging circuit and is inputted to a first and second D/A converters, a stable feedback operation can be effected without being too sensitive in following a change in the potential difference.

With the digital camera system according to the eighth, thirteenth, fifteenth and seventeenth aspects, dark current component in video output signals of an imaging device (such as CCD) is increased for example in an image taking with a long time exposure for taking an image especially by a digital single-lens reflex camera, for example in the image taking where exposure time is made longer at the time of taking a night view. Therefore, clamping accuracy and levels to be pulled in the clamping can be secured even in the case where levels to be pulled (voltage range that can be clamped to a predetermined reference voltage when OB voltage level is shifted) in OB (black level) clamping are required to be wider in range than those at the time of normal exposure. With the digital camera system according to the ninth, fourteenth, sixteenth, and eighteenth aspects, operations of those circuits that are unnecessary at the time of normal exposure can be stopped to reduce current consumption in the digital camera system by providing a decision circuit for detecting exposure time.

With the clamping circuit according to the tenth aspect, high-order and low-order bits of the output bits of A/D converter to be inputted to D/A converter are switched depending on output levels of the potential difference detection circuit, and in addition a reference value of D/A converter is also switched. For this reason, a clamping accuracy can be improved (to what is equivalent to the accuracy of A/D converter) without decreasing the range to be pulled in the clamping even when bit number of the A/D converter is greater than bit number of the D/A converter. With the clamping circuit according to the eleventh aspect, a voltage of the sample hold circuit in the clamping circuit according to the tenth aspect is replaced by a variable voltage source, and a level of the variable voltage source is caused to vary depending on an output level of the difference voltage detection circuit. Further, a clamping is effected to D/A converter with using data based on low-order bits of A/D converter. It is thereby possible to improve a clamping accuracy (to what is equivalent to the accuracy of A/D converter) without decreasing the range to be pulled in the clamping even when bit number of the A/D converter is greater than bit number of the D/A converter. With the clamping circuit according to the twelfth aspect, a clamping accuracy can be improved (to what is equivalent to the accuracy of A/D converter) without decreasing the range to be pulled in the clamping even when bit number of A/D converter is greater than bit number of a first and second D/A converters, with using high-order and low-order bits of the output bits of the A/D converter that are respectively inputted to the first and second D/A converters depending on output level of the potential difference detection circuit.

What is claimed is:

1. A clamping circuit comprising:
   a subtracter for subtracting a clamping correction voltage from an input analog voltage signal;
   A/D converter for converting an analog voltage signal from the subtracter into a digital voltage signal of M bits;
   a potential difference detection circuit for detecting a potential difference between a digital voltage signal outputted from said A/D converter and a previously set clamping voltage;
   D/A converter for converting a digital signal of N (N<M) bits within the digital signal of M bits representing a potential difference outputted from said potential difference detection circuit into an analog signal;
   an adjusting voltage generation circuit for generating an adjusting voltage based on a potential difference outputted from said potential difference detection circuit and a threshold voltage set with respect to the potential difference; and
   an adder for adding together an output from said D/A converter and an adjusting voltage outputted from said adjusting voltage generation circuit to generate said clamping correction voltage.

2. The clamping circuit according to claim 1, wherein said adjusting voltage generation circuit comprises a control circuit for generating a control signal corresponding to a difference voltage between said potential difference and said threshold voltage, and an adjusting voltage generating section for generating an adjusting voltage corresponding to said control signal.

3. The clamping circuit according to claim 2, wherein said adjusting voltage generating section comprises:
   a bit switch circuit where the bits of digital signal representing a potential difference outputted from said potential difference detection circuit to be inputted to said D/A converter are switched to low-order bits;
   a reference voltage switch circuit for switching a reference voltage of said D/A converter to a reference voltage corresponding to said low-order bits; and
   a sample hold circuit for holding an output of said D/A converter and outputting it as an adjusting voltage;
   wherein the functions of said bit switch circuit, said reference voltage switch circuit, and said sample hold circuit are respectively activated when said control signal indicating that said difference voltage is lower than a predetermined voltage is inputted.

4. The clamping circuit according to claim 2, wherein said adjusting voltage generating section comprises a variable voltage source for generating an adjusting voltage corresponding to said control signal.

5. The clamping circuit according to claim 2, wherein said D/A converter is formed as a first D/A converter, and said adjusting voltage generating section comprising:
   a second D/A converter for converting a digital signal of L (L<M) bits within said digital signal of M bits from said potential difference detection circuit into an analog signal to output it as said adjusting voltage; and
   a bit distribution circuit for, of said digital signal of M bits from said potential difference detection circuit, outputting a high-order N-bit digital signal to said first D/A converter and a low-order L-bit digital signal to said second D/A converter and for providing the high-order N-bit digital signal as a fixed output correspondingly to said control signal.

6. The clamping circuit according to claim 1 further comprising an averaging circuit for finding a mean value during a predetermined period of digital signals representing a potential difference outputted from said potential difference detection circuit to be inputted into said D/A converter.

7. The clamping circuit according to claim 5 further comprising an averaging circuit for finding a mean value during a predetermined period of digital signals representing potential difference outputted from said potential difference detection circuit to be inputted to said first and second D/A converters.

8. A digital camera system comprising:
an imaging device for converting an object image into video signals as output; and
the clamping circuit according to claim 1 to which video signals from said imaging device are inputted as said input analog voltage signal, wherein a black level of said video signals is set as said clamping voltage and an output of said A/D converter is outputted as a digital video signal.

9. The digital camera system according to claim 8 further comprising a decision circuit for deciding whether an exposure time exceeds a set value or not, wherein said adjusting voltage generation circuit stops its operation when result of deciding by said decision circuit is that said exposure time does not exceed the set value.

10. A clamping circuit comprising:
A/D converter for converting an input analog voltage signal into a digital voltage signal to provide it as output;
a potential difference detection circuit for detecting a potential difference between a digital output signal A/D-converted by the A/D converter and a first reference voltage serving as a clamping voltage;
a bit switch circuit for switching between high-order bits and low-order bits of a digital output signal of said potential difference detection circuit;
D/A converter for converting a digital output signal of said bit switch circuit into an analog signal;
a sample hold circuit for holding and outputting an output of said D/A converter by high-order bits immediately before the switching of said bit switch circuit from the high-order bits to the low-order bits;
an adder for adding together an output of the sample hold circuit and an output of said D/A converter to output the result thereof as a clamping correction voltage;
a subtracter for effecting a subtraction between an output of the adder and said input analog voltage signal before A/D conversion by said A/D converter and for inputting the subtraction output thereof to said A/D converter;
a difference voltage detection circuit for comparing an output of said potential difference detection circuit and a second reference voltage so as to control said bit switch circuit and a reference value of said D/A converter and an output of said sample hold circuit by the comparison output thereof; and
an averaging circuit for finding and outputting a mean value of the digital output signals in the portion from an output terminal of said A/D converter to an input terminal of said D/A converter.

11. A clamping circuit comprising:
A/D converter for converting an input analog voltage signal into a digital voltage signal to provide it as output;
a potential difference detection circuit for detecting a potential difference between a digital output signal A/D-converted at said A/D converter and a first reference voltage serving as a clamping voltage;
D/A converter for converting a digital output signal of said potential difference detection circuit into an analog signal;
a difference voltage detection circuit for comparing the output signal of said potential difference detection circuit and a second reference voltage;
a variable voltage source capable of changing an output voltage based on an output of the difference voltage detection circuit;
an adder for adding together the output voltage of the variable voltage source and an output of said D/A converter to output the result thereof as a clamping correction voltage;
a subtracter for effecting a subtraction between an output of the adder and said input analog voltage signal before A/D conversion by said A/D converter and for inputting a subtraction output thereof to said A/D converter;
and an averaging circuit for finding and outputting a mean value of the digital output signals in the portion from an output terminal of said A/D converter to an input terminal of said D/A converter.

12. A clamping circuit comprising:
A/D converter for converting an input analog voltage signal into a digital voltage signal to provide it as output;
a potential difference detection circuit for detecting a potential difference between a digital output signal A/D-converted by said A/D converter and a first reference voltage serving as a clamping voltage;
a bit distribution circuit for outputting high-order bits and low-order bits of a digital output signal of the potential difference detection circuit;
a first D/A converter for converting a digital output signal of the high-order bits by said bit distribution circuit into an analog signal;
a second D/A converter for converting a digital output signal of the low-order bits by said bit distribution circuit into an analog signal;
an adder for adding together an output of said first D/A converter and an output of said second D/A converter to output the result thereof as a clamping correction voltage;
a subtracter for effecting a subtraction between an output of the adder and said input analog voltage signal before A/D conversion by said A/D converter and for inputting a subtraction output thereof to said A/D converter;
a difference voltage detection circuit for comparing the output signal of said potential difference detection circuit and a second reference voltage and for providing an output by the high-order bits of said bit distribution circuit as a fixed output depending on a comparison output thereof; and
an averaging circuit for finding and outputting a mean value of the digital output signals in the portion from an output terminal of said A/D converter to an input terminal of said first D/A converter.

13. A digital camera system comprising:
an imaging device for converting an object image into video signals as output; and
the clamping circuit according to claim 10 to which video signals from said imaging device are inputted as said input analog voltage signal, wherein a black level of said video signals is set as said clamping voltage and an output of said A/D converter is outputted as a digital video signal.

14. The digital camera system according to claim 13 further comprising a decision circuit for deciding whether an exposure time exceeds a set value or not, wherein said difference voltage detection circuit and said sample hold circuit stop their operation when a result of said decision is that said exposure time does not exceed the set value.

15. A digital camera system comprising:
an imaging device for converting an object image into video signals as output; and
the clamping circuit according to claim 11 to which video signals from said imaging device are inputted as said input analog voltage signal, wherein a black level of said video signals is set as said clamping voltage and an output of said A/D converter is outputted as a digital video signal.

16. The digital camera system according to claim 15 further comprising a decision circuit for deciding whether an exposure time exceeds a set value or not, wherein said difference voltage detection circuit and said variable voltage source stop their operation when a result of said decision is that said exposure time does not exceed the set value.

17. A digital camera system comprising:
an imaging device for converting an object image into video signals as output; and
the clamping circuit according to claim 12 to which video signals from said imaging device are inputted as said input analog voltage signal, wherein a black level of said video signals is set as said clamping voltage and an output of said A/D converter is outputted as a digital video signal.

18. The digital camera system according to claim 17 further comprising a decision circuit for deciding whether an exposure time exceeds a set value or not, wherein said difference voltage detection circuit and said first D/A converter stop their operation when a result of said decision is that said exposure time does not exceed the set value.

* * * * *